United States Patent
Day et al.

(10) Patent No.: US 7,334,042 B2
(45) Date of Patent: Feb. 19, 2008

(54) SYSTEMS AND METHODS FOR INITIATOR MODE CONNECTION MANAGEMENT IN SAS CONNECTIONS

(75) Inventors: Brian A. Day, Colorado Springs, CO (US); Silvia Jaeckel, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 561 days.

(21) Appl. No.: 10/920,987

(22) Filed: Aug. 18, 2004

(65) Prior Publication Data

US 2006/0041672 A1 Feb. 23, 2006

(51) Int. Cl.
*G06F 15/16* (2006.01)
*G06F 13/42* (2006.01)
*H04L 12/28* (2006.01)

(52) U.S. Cl. ............... 709/230; 710/106; 370/254
(58) Field of Classification Search ......... 709/224, 709/230, 220; 710/106, 3, 36; 370/254; 371/46
See application file for complete search history.

(56) References Cited

U.S. PATENT DOCUMENTS

| | | | |
|---|---|---|---|
| 7,028,106 B2 | 4/2006 | Foster et al. | |
| 7,035,952 B2 | 4/2006 | Elliott et al. | |
| 7,171,500 B2* | 1/2007 | Day et al. | 710/106 |
| 2004/0205259 A1* | 10/2004 | Galloway | 710/3 |
| 2005/0080881 A1 | 4/2005 | Voorhees et al. | |
| 2005/0125574 A1 | 6/2005 | Foster et al. | |
| 2005/0185599 A1 | 8/2005 | Clayton | |
| 2006/0039405 A1 | 2/2006 | Day et al. | |
| 2006/0039406 A1 | 2/2006 | Day et al. | |
| 2006/0041672 A1 | 2/2006 | Day et al. | |

OTHER PUBLICATIONS

"Introduction to Serial Attached SCSI", Mark Evans, Maxtor, May 23, 2003, pp. 1-5.

* cited by examiner

*Primary Examiner*—Ario Etienne
*Assistant Examiner*—Uzma Alam
(74) *Attorney, Agent, or Firm*—Duft Bornsen & Fishman, LLP

(57) ABSTRACT

Methods and structures for managing connection requests within a SAS controller operating as an initiator device. A SAS initiator device maintains a table of information regarding known SAS devices in the SAS domain. An index value is used by each of a plurality of link layer processing elements in the SAS controller to access information in the table. The index value is fewer bits than the complete eight byte SAS address and the logic to manipulate and compare the index value is therefore simpler than that required to directly manipulate a full SAS address. Further, the information table is shared by each of the link layer processing elements to further reduce complexity from replication of circuits and logic in the SAS controller.

20 Claims, 5 Drawing Sheets

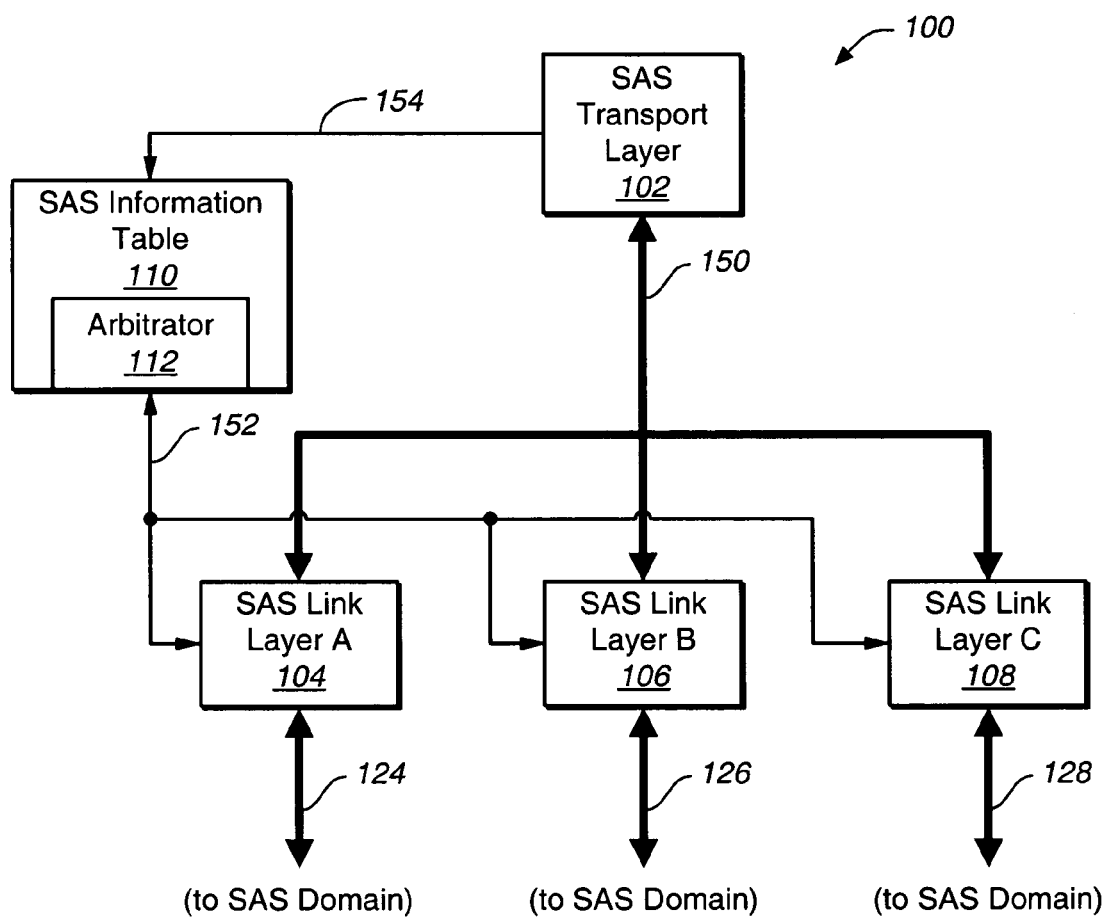
FIG._1

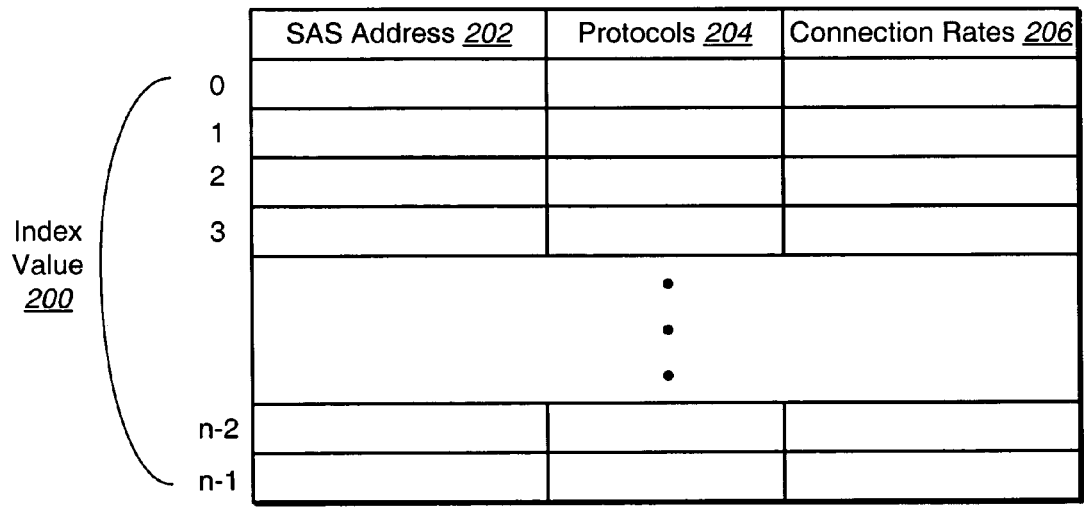
FIG._2
FIG._3

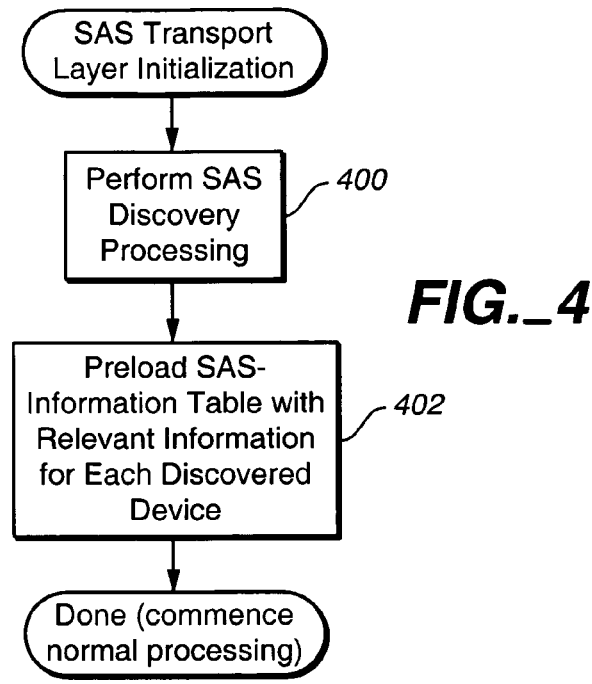
FIG._4
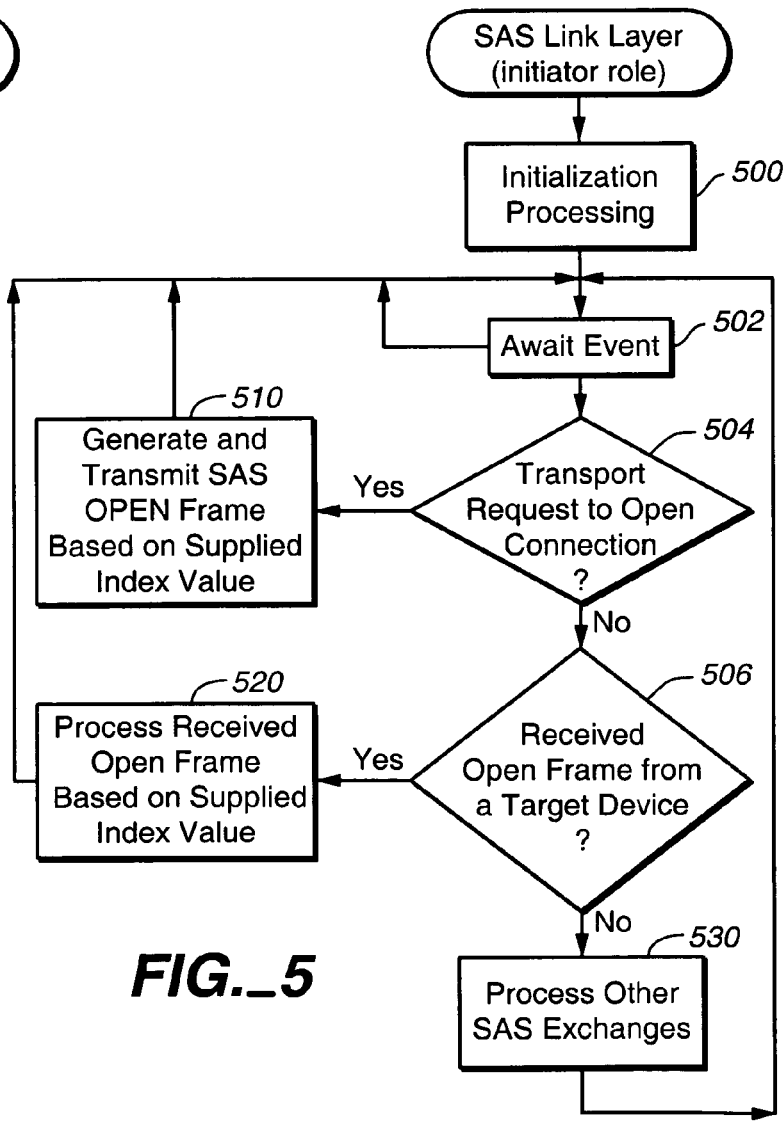
FIG._5

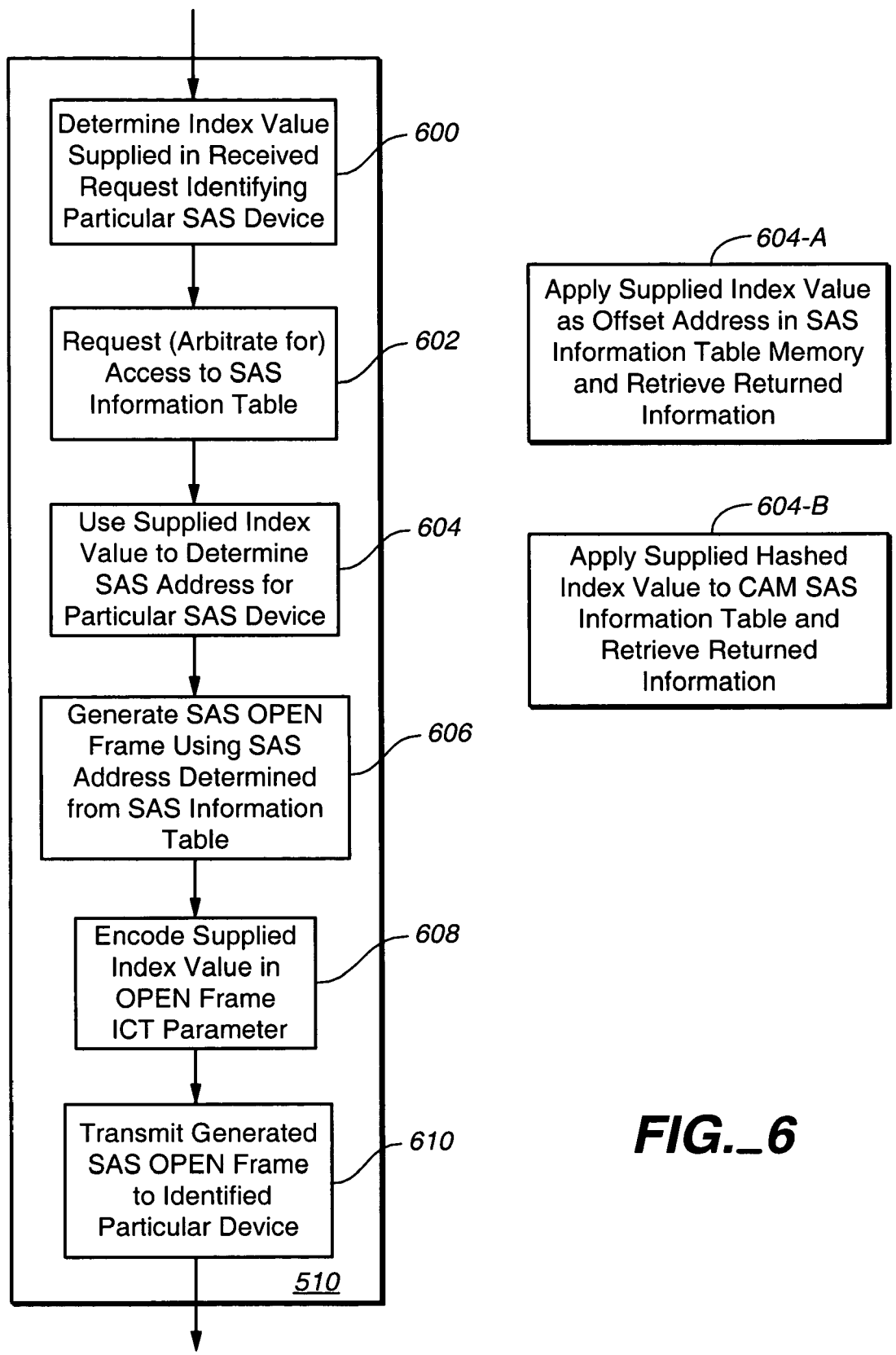
FIG._6

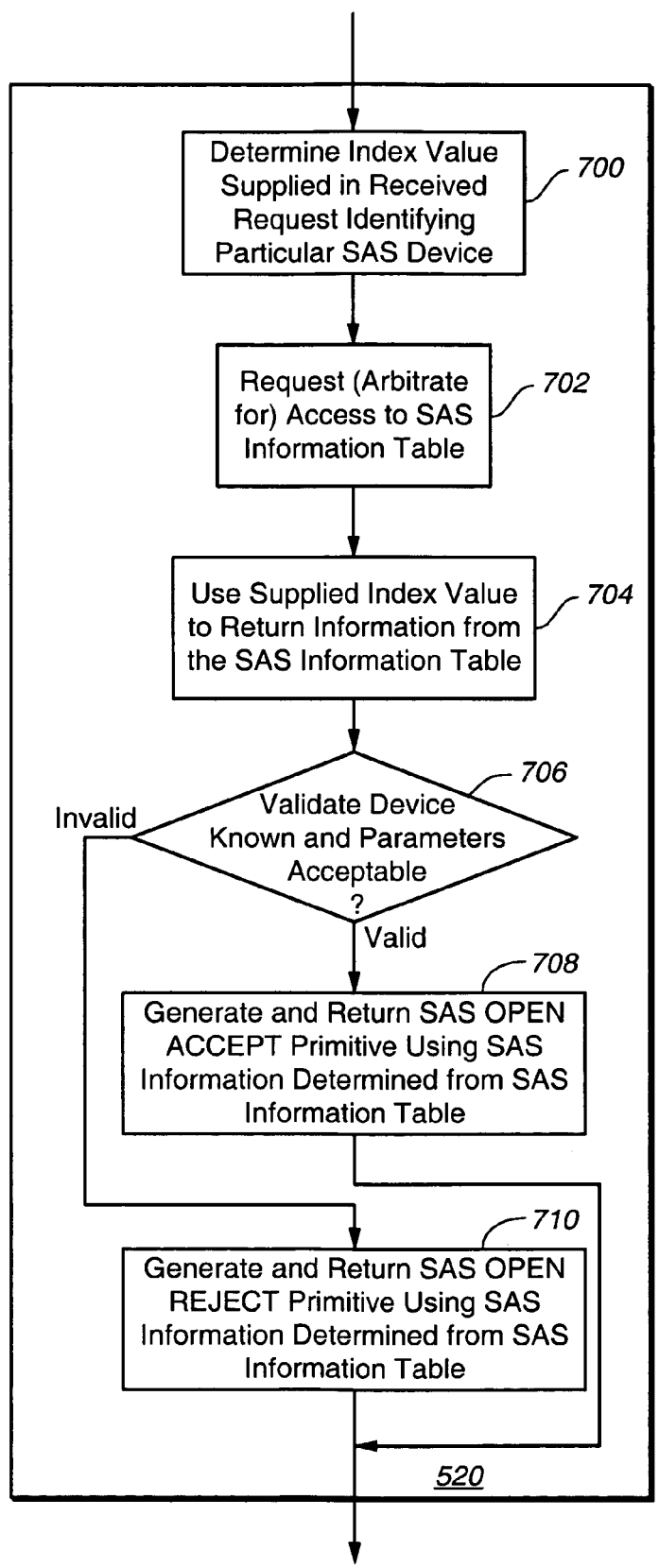
FIG._7

SYSTEMS AND METHODS FOR INITIATOR MODE CONNECTION MANAGEMENT IN SAS CONNECTIONS

RELATED PATENTS

This patent is related to commonly owned U.S. patent application Ser. No. 10/920,897 filed on 18 Aug. 2004 and entitled SYSTEMS AND METHODS FOR TARGET MODE CONNECTION MANAGEMENT IN SAS CONNECTIONS, now issued as U.S. Pat. No. 7,171,500, which is hereby incorporated by reference.

BACKGROUND OF THE INVENTION

1. Field of the Invention

The invention generally relates to managing connections in a SAS domain. More specifically, the invention relates to simplified methods and structures to manage OPEN requests in a SAS initiator device.

2. Discussion of Related Art

Small Computer Systems Interface ("SCSI") is a set of American National Standards Institute ("ANSI") standard electronic interface specifications that allow, for example, computers to communicate with peripheral hardware. Common SCSI compatible peripheral devices may include: disk drives, tape drives, Compact Disc-Read Only Memory ("CD-ROM") drives, CD Read/Write ("CD-RW"), digital versatile disk ("DVD") drives, printers, scanners, etc. SCSI as originally created included both a command/response data structure specification and an interface and protocol standard for a parallel bus structure for attachment of devices. SCSI has evolved from exclusively parallel interfaces to include both parallel and serial interfaces. "SCSI" is now generally understood as referring either to the communication transport media (parallel bus structures and various serial transports) or to a plurality of primary commands common to most devices and command sets to meet the needs of specific device types as well as a variety of interface standards and protocols.

The collection of primary commands and other command sets may be used with SCSI parallel interfaces as well as with serial interfaces. Examples of serial interface transport media and protocol standards that support SCSI command processing include: Fibre Channel, Serial Bus Protocol (used with the Institute of Electrical and Electronics Engineers 1394 FireWire physical protocol; "IEEE 1394") and the Serial Storage Protocol (SSP).

SCSI interface transports and commands are also used to interconnect networks of storage devices with processing devices. For example, serial SCSI transport media and protocols such as Serial Attached SCSI ("SAS") and Serial Advanced Technology Attachment ("SATA") may be used in such networks. These applications are often referred to as storage networks. Those skilled in the art are familiar with SAS and SATA standards as well as other SCSI related specifications and standards. Information about such interfaces, media, protocols and commands is generally obtainable at the website www.t10.org.

Such SCSI storage networks are often used in large storage systems having a plurality of disk drives to store data for organizations and/or businesses. The network architecture allows storage devices to be physically dispersed in an enterprise while continuing to directly support SCSI commands directly. This architecture allows for distribution of the storage components in an enterprise without the need for added overhead in converting storage requests from SCSI commands into other network commands and then back into lower level SCSI storage related commands.

A SAS network typically comprises one or more SAS initiators coupled to one or more SAS targets via one or more SAS expander devices. In general, as is common in all SCSI communications, SAS initiators initiate communications with SAS targets. In particular, SAS initiators use a process often referred to as "discovery" to determine the topology of devices in the network (i.e., to discover other SAS initiators, SAS expanders and SAS targets). Once such information is known, initiators generally establish the first contacts with a given target device. The initiator issues an "open" request (i.e., a SAS OPEN address frame) to an identified SAS target to establish a first connection with the SAS target device. Once the first connection is so established, either the SAS initiator or the SAS target device may re-establish a connection. For example, a connection may be established initially by the initiator, closed after some transactions are exchanged, and then re-opened by the same initiator for a subsequent sequence of transactions. Or, for example, a SAS target device may have deferred processing of a transaction received from an initiator. At some later time when the SAS target is ready to proceed, the target device may "open" a connection back to the initiator that originally requested the deferred transaction.

In SAS protocol exchanges, SAS initiator devices and SAS target devices (as well as SAS expanders) are identified by an eight byte SAS address. The SAS address is intended as a globally unique ID for the device determined, in part, according to industry standards. In establishing such connections by "open" requests, the recipient of an OPEN request is provided with the SAS address of the requesting transmitter (the source SAS address) and the recipient is identified by its SAS address (the destination SAS address).

SAS initiators and targets usually include a SAS controller integrated circuit or interface chip set for implementing various levels of the SAS communication protocols. Such controller chips or chip sets usually implement various aspects of the SAS protocols in custom designed circuits to maintain desired (or required) levels of performance in the SAS protocol exchanges. In particular, SAS controller circuits used in typical SAS initiators and SAS targets often implement SAS address comparison and detection logic in custom circuits designed within the integrated circuit package or chip set. Such address comparison and detection logic is usually required to permit full speed operation of the SAS protocols to quickly detect that a received frame is intended for an identified recipient or is from a known device.

The design of such SAS address comparison and detection logic is significantly complicated by the need to compare a complete 8-byte SAS address. The sheer size of such a complex, 64-bit identifier makes the corresponding detection and comparison logic large and complex. Such a large, complex circuit design adds cost to the SAS controller, increases the size of the circuit and potentially increases power consumption and heat dissipation requirements. More importantly, in a SAS wide port application where multiple physical links are logically aggregated for use in a SAS exchange, each physical link component may require similar comparison and detection logic. The complex logic may therefore be replicated numerous times in the overall SAS controller design. Such added complexity and added power and cooling requirements may be highly undesirable in various computing and electronics environments.

In view of the above discussion, it is evident that there is an ongoing need for improved systems and methods for reducing the complexity of methods and logic in a SAS controller for comparing and detecting SAS addresses in the establishment and management of connections between SAS initiators and SAS targets.

SUMMARY OF THE INVENTION

The present invention solves the above and other problems, thereby advancing the state of useful arts, by providing methods and associated structures for sharing SAS information between multiple elements of a SAS controller and to encode SAS device identification information associated with such a shared table structure in a more concise, simpler format.

A first feature hereof therefore provides a SAS controller adapted for performing SAS protocol link layer processing in the role of a SAS initiator, the controller comprising: an interface to a SAS protocol transport layer processing element wherein the controller is adapted to receive a request from the transport layer through the interface to establish a connection to a particular SAS device, and wherein the particular SAS device is identified by a supplied index value in the request, and wherein the supplied index value comprises fewer bits than the SAS address in the request; a table having a plurality of entries each storing a corresponding SAS address for a SAS device; and a SAS protocol link layer processing element coupled to the interface and coupled to the table wherein the link layer is adapted to use the supplied index value and the table to determine the corresponding SAS address for the particular SAS device, and wherein the link layer is adapted to use the corresponding SAS address in an OPEN request to establish the requested connection to the particular SAS device.

Another aspect hereof further provides that the SAS protocol link layer processing element comprises a plurality of SAS protocol link layer processing elements each coupled to the interface and each coupled to the table and wherein the controller further comprises: an arbitrator for arbitrating among the plurality of SAS protocol link layer processing elements when multiple of the plurality of SAS protocol link layer processing elements attempts to access the table.

Another aspect hereof further provides that the table is pre-loaded by the SAS transport layer processing element with SAS addresses discovered during SAS Discovery processing of the SAS controller.

Another aspect hereof further provides that the SAS protocol link layer processing element is further adapted to encode the supplied index value in parameters of the OPEN request.

Another aspect hereof further provides that the SAS protocol link layer processing element is further adapted to encode the supplied index value in the ICT parameter field of the OPEN request.

Another aspect hereof further provides that the supplied index value is a supplied hashed address index value determined by a hash function applied to a SAS address and wherein the table comprises: a content addressable memory device storing rows comprising a SAS address and a corresponding hashed address index value, and wherein the SAS protocol link layer is adapted to access the content addressable memory by applying the supplied hashed address index value to the content addressable memory to retrieve the corresponding SAS address.

Another feature hereof provides a method operable in a SAS controller having at least one SAS protocol link layer processing element and adapted to interface with a SAS protocol transport layer processing element and operating in the role of a SAS initiator, the method comprising: receiving a request from the SAS protocol transport layer processing element to establish a connection to a particular SAS device identified in the request by a supplied index value wherein the supplied index value comprises fewer bits than the SAS address in the request; accessing a table using the supplied index value to determine the SAS address for the particular SAS device; generating an OPEN request to establish the requested connection to the particular SAS device wherein the generated OPEN request uses the SAS address determined by access to the table; and transmitting the generated OPEN request to the particular SAS device.

Another aspect hereof further provides that the SAS controller has multiple SAS protocol link layer processing elements coupled to the table and wherein the method further comprises: arbitrating among a plurality of the multiple SAS protocol link layer processing elements requesting access to the table.

Another aspect hereof further provides for performing a SAS Discovery process to discover the SAS address of SAS target devices coupled to the SAS controller; and pre-loading the table with the SAS addresses discovered in the SAS Discovery process.

Another aspect hereof further provides that the step of generating further comprises: encoding the supplied index value as a parameter in the generated OPEN request.

Another aspect hereof further provides that the step of encoding further comprises: encoding the supplied index value in the ICT parameter field of the OPEN request.

Another aspect hereof further provides that the step of receiving further comprises: receiving the request wherein the particular SAS device is identified in the request by a supplied hashed address index value wherein the supplied index value comprises fewer bits than the SAS address associated with the particular SAS device, and further provides that the step of accessing further comprises: applying the supplied hashed address index value to a content addressable memory storing the table to retrieve the SAS address corresponding to the supplied hashed address index value associated with the particular SAS device.

Another feature hereof provides a SAS controller adapted for performing SAS protocol link layer processing in the role of a SAS target, the controller comprising: an interface to a SAS communication physical medium wherein the controller is adapted to receive an OPEN request from the physical medium through the interface to establish a connection to a particular SAS device, and wherein the particular SAS device is identified by a supplied index value in the OPEN request, and wherein the supplied index value comprises fewer bits than the SAS address in the OPEN request; a table having a plurality of entries each storing SAS connection information for a corresponding SAS device known to the controller; and a SAS protocol link layer processing element coupled to the interface and coupled to the table wherein the link layer is adapted to use the supplied index value and the table to access the SAS connection information corresponding to the particular SAS device, and wherein the link layer is adapted to use the SAS connection information to validate the received request.

Another aspect hereof further provides that the SAS protocol link layer processing element comprises a plurality of SAS protocol link layer processing elements and wherein the interface comprises a plurality of interface to SAS communication physical media and wherein each SAS protocol link layer processing element is coupled to a corresponding interface and is coupled to the table and wherein the controller further comprises: an arbitrator for arbitrating among the plurality of SAS protocol link layer processing elements when multiple of the plurality of SAS protocol link layer processing elements attempts to access the table.

Another aspect hereof further provides that the SAS connection information includes: a SAS address of the corresponding SAS device; a connection rate indicator indicating SAS connection rates supported by the corresponding SAS device; and a protocol indicator indicating SAS protocols supported by the corresponding SAS device.

Another aspect hereof further provides that the SAS protocol link layer processing element is further adapted to decode the supplied index value from parameters of the received OPEN request.

Another aspect hereof further provides that the SAS protocol link layer processing element is further adapted to decode the supplied index value in the ICT parameter field of the received OPEN request.

Another aspect hereof further provides that the supplied index value is a supplied hashed address index value determined by a hash function applied to a SAS address and wherein the table comprises: a content addressable memory device storing rows comprising a SAS address and a corresponding hashed address index value, and wherein the SAS protocol link layer is adapted to access the content addressable memory by applying the supplied hashed address index value to the content addressable memory to retrieve the corresponding SAS address.

Another feature hereof provides a method operable in a SAS controller having at least one SAS protocol link adapted to interface with a SAS communication medium and operating in the role of a SAS initiator, the method comprising: receiving an OPEN request from the SAS communication medium to establish a connection to a particular SAS device identified in the request by a supplied index value in the received OPEN request wherein the supplied index value comprises fewer bits than the SAS address associated with the particular SAS device; accessing a table using the supplied index value to retrieve SAS connection information for the particular SAS device; validating parameters of the received OPEN request based on the retrieved SAS connection information; and transmitting a response to the SAS communication medium in response to the OPEN request to indicate the validity of the received OPEN request.

Another aspect hereof further provides that the SAS controller has multiple SAS protocol link layer processing elements coupled to the table and wherein the method further comprises: arbitrating among a plurality of the multiple SAS protocol link layer processing elements requesting access to the table.

Another aspect hereof further provides performing a SAS Discovery process to discover the SAS connection information of SAS devices known to the SAS controller; and pre-loading the table with the SAS connection information discovered in the SAS Discovery process.

Another aspect hereof further provides that the step of generating further comprises: decoding the supplied index value from a parameter in the received OPEN request.

Another aspect hereof further provides that the step of decoding further comprises: decoding the supplied index value from the ICT parameter field of the received OPEN request.

Another aspect hereof further provides that the step of receiving further comprises: receiving the request wherein the particular SAS device is identified in the request by a supplied hashed address index value wherein the supplied index value comprises fewer bits than the SAS address associated with the particular SAS device, and further provides that the step of accessing further comprises: applying the supplied hashed address index value to a content addressable memory storing the table to retrieve the SAS connection information corresponding to the supplied hashed address index value associated with the particular SAS device.

BRIEF DESCRIPTION OF THE DRAWINGS

FIG. 1 is a block diagram of a SAS controller embodying features and aspects hereof.

FIG. 2 is a block diagram of an exemplary SAS information table structure for storing information regarding SAS devices in accordance with features and aspects hereof.

FIG. 3 is a block diagram of another exemplary SAS information table structure for storing information regarding SAS devices in accordance with features and aspects hereof.

FIG. 4 is a flowchart describing operation of a method to preload a SAS information table during transport layer initialization processing in accordance with features and aspects hereof.

FIG. 5 is a flowchart describing operation of a SAS link layer processing element in accordance with features and aspects hereof to process OPEN requests using a supplied index value.

FIG. 6 is a flowchart describing additional details of the operation of FIG. 5 to open a connection as an initiator in response to a request from a transport layer processing element.

FIG. 7 is a flowchart describing additional details of the operation of FIG. 5 to open a connection as an initiator in response to a request from a SAS target device.

DETAILED DESCRIPTION OF THE DRAWINGS

FIG. 1 is a block diagram of a SAS controller 100 enhanced in accordance with features and aspects hereof. As is common in SAS controllers implementing SAS protocols in accordance with standard specifications, a transport layer processing element 102 provides certain higher level processing features of the SAS protocol while link layer processing elements 104, 106 and 108 provide lower level protocol management features. Each link layer processing element 104, 106 and 108 is coupled to a corresponding SAS communication medium 124, 126 and 128, respectively. The SAS communication media 124, 126 and 128 may be any suitable communication medium supporting the SAS protocols including, for example, conductive wired media, optical media, radio frequency transceiver media, etc.

As used herein, "processing element" refers to an element of SAS controller 100 responsible for processing identified layer of the SAS protocol. In other words, the transport layer processing element 102 is any element providing processing associated with transport layer specifications of the SAS protocol while link layer or physical layer processing elements 104, 106 and 108 refer to any element within SAS controller 100 responsible for processing lower layer physical and link protocols of the SAS specification. Such processing elements may include discrete processing electronic components as well as programmed instructions operating within appropriate general or special purpose processors. Further, such processing elements may be operable within a single, integrated processing element or may be distributed over plurality of such processing elements.

In general, SAS transport layer processing element 102 exchanges information with link processing elements 104, 106 and 108 to effectuate SAS protocol communications with other SAS compliant devices or expanders. As noted above, a SAS controller 100 may generate, transmit and receive requests to "open" a connection to another SAS device. Such requests are generally transmitted or received in the form of SAS OPEN address frames (e.g., "open" requests) with various parameters. Among the parameters may be SAS addresses for the requesting device and for the intended destination device for the OPEN request (i.e., the source and destination SAS addresses).

Further, as noted above, a SAS device utilizing such a SAS controller 100 may operate either in an initiator mode or in a target mode. In general, SAS devices operating in an initiator mode initiate a connection with another SAS device operating in a target mode. An OPEN request is generated and transmitted from the initiator mode SAS device to the target mode SAS device to initially establish such a connection. In certain SAS protocol exchanges, a target device may defer completion of an exchange, for example, to await availability of requested data or completion of some associated processing. In such situations, the SAS target device may temporarily close the previously established connection between the initiator device and the target device and may, at a later time, reestablish the connection by generating and transmitting an OPEN request back to the appropriate SAS initiator device. Such an architecture in the SAS protocols frees a SAS initiator device to perform other operations while awaiting completion of a first exchange.

As noted above, the volume of information regarding targeted devices and initiator devices known to a particular SAS controller of a SAS device can impose design complexity and performance problems on a SAS controller. In accordance with features and aspects hereof, the transport layer processing element 102 and the link layer processing elements 104, 106 and 108 may share SAS information regarding SAS devices by storing such information in a shared SAS information table 110 and retrieving the shared information as required for processing of OPEN requests. As discussed further herein below, SAS information table 110 may be implemented as any of a variety of memory structures including, for example, register files, random access memories (RAM devices including nonvolatile memory devices) or other well-known memory devices suitable for storing and retrieving SAS information regarding SAS devices known to the controller 100.

In general, SAS information table 110 may be initially populated in SAS initiator devices by operation of SAS discovery processing in SAS transport layer 102. The SAS information table 110 in a SAS target device may be, in general, initially populated as information becomes known to the SAS target device from connection requests received from associated SAS initiator devices. Further details of such processing to populate information in SAS information table 110 are provided herein below.

SAS information table 110 may be subjected to substantially simultaneous requests from multiple SAS link layer processing elements 104, 106 and 108 and transport layer processing element 102. To assist in managing such substantially simultaneous requests, arbitrator 112 may be associated with SAS information table 110 to arbitrate among a plurality of such substantially simultaneous requests. In one exemplary embodiment as shown, SAS information table 110 may provide a second port for independent access by SAS transport layer 102 (i.e., a dual port memory device). Alternatively, SAS transport layer 102 may access SAS information table 110 through appropriate connections (not shown) with arbitrator 112 to share access to the memory component along with SAS link layer processing elements 104, 106 and 108.

Those of ordinary skill in the art will readily recognize a variety of equivalent configurations for SAS controller 100 capable of providing features and aspects hereof to share information regarding SAS devices coupled to a plurality of SAS link layer processing elements and associated transport layer processing elements. Further, those of ordinary skill in the art will recognize that any number of SAS link layer processing elements may be provided as required by a particular application and in compliance with the wide port capabilities provided by the SAS specifications. Still further, those of ordinary skill in the art will recognize a wide variety of other associated elements to provide complete functionality of SAS controller 100. FIG. 1 depicts only those elements that generally relate to features and aspects hereof.

SAS information table 110 of FIG. 1 may be implemented using any of numerous memory element designs. As noted above, SAS information table 110 may be implemented utilizing register files, random access memory devices (RAM) including nonvolatile random access memory devices, and other well-known memory component architectures. Further, the information stored in such a table may be accessed utilizing simple index values or using content addressable memory architecture structures. As noted above, in accordance with features and aspects hereof, an index value is preferably utilized to store and retrieve relevant information stored in the SAS information table and associated with a particular SAS initiator or target device. Such an index value may then be utilized to exchange information between the various layers of the SAS protocol controller. The index value is preferably simple (i.e., fewer bits) as compared to the larger, eight byte long SAS address used to globally identify SAS devices. For example, where a particular application of features and aspects hereof requires knowledge of at most 128 SAS devices within a particular SAS controller, a seven bit index value may be used to uniquely identify each of the 128 possible devices known to the SAS controller. Each known device may be assigned an index value between 0 and 127 as a simpler representation of its identity as compared to the 8-byte (64 bit) full SAS address. Circuits and logic associated with comparison and manipulation of such a seven bit field may be substantially simpler than the circuits and logic associated with comparison and manipulation of an eight-byte (64 bit) value.

The index value so manipulated by the SAS transport layer processing element and the SAS link layer processing elements may be used to index to, or locate, information within the SAS information table 110 of FIG. 1. FIGS. 2 and 3 depict exemplary structures useful for storing information within such a SAS information table and for accessing the information utilizing a simplified index value. FIG. 2 shows a simple table structure having multiple rows each including multiple columns of data. An index value 200 ranging between 0 and N−1, where N is the maximum number of devices to be managed by the controller, may be used to index directly to a corresponding row in the table structure of FIG. 2. Each column of the identified row contains a portion of relevant information for an associated SAS device. Exemplary of such information may be a SAS address 202 comprising the full eight byte SAS address associated with the corresponding SAS device, protocols field 204 indicates the particular SAS protocols supported by the corresponding SAS device, and connection rates column 206 indicates the connection rates that are supported by the corresponding SAS device. These exemplary columns, and potentially other columns, provide information regarding corresponding SAS devices known to the associated SAS controller. The simple index value 200 may be used to rapidly locate the appropriate row and, as necessary, to access the information associated with the corresponding SAS device.

FIG. 3 shows another exemplary embodiment where a content addressable memory ("CAM") may be used to store SAS information regarding each SAS device known to the SAS controller. Content addressable memories are generally known to those of ordinary skill in the art and are operable such that an index value 300 may be applied as an input into the content addressable memory. In response to the application of such an index value input, the content of addressable memory locates a row where the unique index value 300 matches the index value applied as an input to the content addressable memory. The corresponding other columns for the matching row may then be returned from the CAM. Exemplary other fields may include, as above, a SAS address 302, supported protocols indicia 304, and supported connection rates indicia 306.

In addition to the simple indexed memory of FIG. 2 and the content addressable memory of FIG. 3, those of ordinary skill in the art will recognize a wide variety of other memory structures useful for storing and retrieving SAS information regarding the SAS devices known to the corresponding controller. The index structure of FIG. 2 and the CAM structure of FIG. 3 are therefore intended merely as representative of exemplary embodiments useful in conjunction with features and aspects hereof. Numerous other equivalent structures will be readily apparent to those of ordinary skill in the art where a simplified index value may be used to identify a SAS device and to store and retrieve more complex information regarding SAS devices including, for example, the full eight byte SAS address associated with a SAS device.

FIGS. 4 through 7 are flowcharts describing methods associated with features and aspects hereof operable within a SAS controller utilizing a simplified index value to manage SAS information regarding SAS devices known to a SAS controller. FIGS. 4 through 7 represent methods operable with a SAS controller operating in initiator mode.

As noted above, in a SAS device typically operable as an initiator SAS device, the transport layer processing element generally performs a SAS discovery process to discover information regarding other SAS devices coupled to the SAS initiator device performing the discovery process. The SAS information table associated with such an enhanced SAS controller may be initially populated by the transport layer performing such a discovery process. FIG. 4 is a flowchart describing an enhanced transport layer in association with features and aspects hereof to populate the SAS information table during, or following completion of, the SAS and discovery process. In particular, element 400 represents standard processing within such an enhanced SAS controller to provide SAS discovery processing. As known to those of ordinary skill in the art, the SAS and discovery process discovers information regarding each SAS device coupled to the SAS initiator device performing the discovery process (coupled directly or through SAS expanders in a more complex SAS domain). Element 402 then represents processing performed generally by the SAS transport layer of the enhanced SAS controller to preload the SAS information table with relevant information corresponding to each discovered SAS device. As a matter of design choice, processing of element 400 and element 402 may be sequential or may be substantially integrated so as to be overlapped.

It will be recognized by those skilled in the art that other techniques may be applied to initially load information into the SAS information table. For example, a separate additional initialization step, either manual or automated, may be provided following initial discovery processing to pre-load the SAS information table with information for each known device and to thereby associate an index value with each entry in the table. Alternatively, the SAS information table may be loaded as the initiator device is first requested to connect to an identified, particular SAS device. In other words, the SAS information table could be loaded as new open connections are initially requested by application or system processes using the SAS controller in an initiator mode. Such design choices for initially loading information into the SAS information table will be readily apparent to those of ordinary skill in the art.

FIG. 5 is a flowchart describing processing of a SAS link layer operating in an initiator mode and in accordance with features and aspects hereof. Element 500 represents any standard initialization processing required for operation of the link layer processing element within an enhanced SAS controller. Element 502 then represents processing to await signaling of an event requiring further processing by the link layer. Such events may include, for example, receipt of a request from a higher level layer (i.e., the transport layer within the same SAS controller) or receipt of a frame from the SAS communication media coupled to the link layer processing element. Upon detection of such an event requiring further processing, element 504 is next operable to determine whether the event corresponds to a received OPEN request from the transport layer coupled to the link layer within the same SAS controller. If not, element 506 determines whether the detected event corresponds to receipt of an OPEN request from an attached SAS target device received via the associated SAS communication medium. If the event is some other event, element 530 represents other processing within the link layer processing element to process another SAS protocol exchange event. Such other processing is associated with events unrelated to the particular features and aspects hereof and is generally well known to those of ordinary skill in the art. On completion of required processing for the detected other event, processing continues by looping back to element 502 to await detection of the next relevant event for processing within the link layer of the SAS controller.

If element 504 determines that the detected event corresponds to receipt of an OPEN request from the higher level transport layer within the same SAS controller, element 510 represents processing to generate and transmit an appropriate OPEN request based on the supplied index value received from the transport layer. As noted above, in accordance with features and aspects hereof, the transport layer may initially populate the SAS information table within the enhanced SAS controller such that an OPEN request from the higher transport layer may simply supply an index value to the link layer processing element to identify the SAS device to which an open connection is requested. The supplied index value is simpler than a full eight byte SAS address and therefore requires simpler processing within the link layer processing element. Further, as noted above, in a wide port environment, the same index value may be supplied to any of the multiple link layer processing elements associated with an established wide port.

The link layer processing utilizes the simplified supplied index value to extract information as needed from the SAS information table. Each of the multiple link layer processing elements configured as a SAS wide port may utilize the same pre-loaded SAS information table to similarly simplify processing of the new OPEN request. The SAS information utilized may include, for example, the full SAS address as well as other parameters associated with a corresponding SAS device known to the enhanced SAS controller. Further details of the processing of element 510 are provided herein below with respect to FIG. 6. Upon completion of the processing of element 510, processing continues looping back to element 502 to await detection of the next event that requires processing by the link layer of the enhanced SAS controller.

If element 506 determines that the detected event signals receipt of an OPEN request via the SAS communication medium from an attached SAS target device, element 520 is operable to process the received OPEN request based on the supplied index value received in the associated OPEN request. As noted above and as discussed further herein below, an OPEN request generated and transmitted from the initiator SAS device to an identified SAS target device includes the supplied index value encoded within the OPEN request. An OPEN request later returned from the identified particular SAS target device must (according to SAS specifications) include the supplied index value initially provided to the target device by the initiator device. Again, utilization of such a simplified index value in the processing of a received OPEN request from a SAS target device simplifies the circuits and logic associated with the SAS controller. The details of the processing of element of 520 are provided herein below with reference to FIG. 7. Upon completion of the processing of element 520, processing continues looping back to element 502 to await detection of a next event to be processed by the SAS link layer of the enhanced SAS controller.

FIG. 6 represents a flowchart providing further details of the processing of element 510 discussed above with respect to FIG. 5. Element 510 of FIG. 5 represents exemplary processing within the link layer of an enhanced SAS controller in response to detection of an OPEN request from the higher level transport layer within the same SAS controller operating in an initiator mode. The transport layer processing element may request such an open connection in response to system or user application processes desiring an exchange with an identified particular SAS device operating in a target mode. As noted above, such an OPEN request preferably supplies an index value to identify the particular SAS device. The supplied index value is simpler than the corresponding eight byte SAS address therefore simplifying circuits and logic within the SAS controller for managing and processing such an OPEN request. FIG. 6 therefore supplies additional details of the processing of element 510 to manage such an OPEN request from the higher level transport layer in the enhanced SAS controller.

Element 600 of FIG. 6 first determines the index value supplied in the received request. The supplied index value identifies the particular SAS device operating in a target mode for which an open connection has been requested. Element 600 therefore decodes or extracts the index value from the received OPEN request. Since multiple link layer processing elements may coexist within the enhanced SAS controller and since multiple such link layer processing elements may be substantially simultaneously operable for managing a SAS wide port, it may be useful to arbitrate among multiple simultaneously operating link layers to coordinate access to the shared SAS information table. Element 602 therefore represents processing to request or arbitrate for access to the shared SAS information table. Such arbitration may be implemented by well known arbitration logic and methods implemented within the enhanced SAS controller. Numerous arbitration techniques and structures are known to those of ordinary skill in the art and may be usefully applied with features and aspects hereof to permit arbitration to coordinate access to the shared SAS information table.

Having successfully arbitrated for access to the shared memory device storing the SAS information table, element 604 is next operable to utilize the supplied index value to locate relevant SAS information from the SAS information table corresponding to the particular SAS device identified by the supplied index value. As noted above, numerous memory structures may be utilized for the SAS information table such that the supplied index value may be used to retrieve relevant information for the corresponding SAS target device. For example, element 604-A of FIG. 6 represents one exemplary embodiment wherein the supplied index value may be used merely as an offset address into the SAS information table memory structure to identify an associated row. Such simple indexing to identify a row of the SAS information table permits use of a table having only as many rows as necessary to support the maximum number of devices defined by the particular SAS controller. Each possible entry/row may be indexed by an offset ranging between zero and N−1 where N is the number of devices supported by the associated SAS controller. Element 604-B. provides another exemplary embodiment wherein a content addressable memory (CAM) may be used. An index value identifying a SAS device may be stored in association with the other SAS information corresponding to a particular SAS device. By then applying the supplied index value to the CAM, the other SAS information may be thereby retrieved due to its association with the supplied index value. In one exemplary embodiment of such a CAM structure, the supplied indexed value may be a unique index value such as a hashed address version of the full SAS address. SAS specifications provide one exemplary technique for hashing the full eight byte address to produce a three byte hashed address index value useful for uniquely identifying a particular SAS device. Those of ordinary skill in the art will recognize that care may be required to assure that the hash function selected in a particular application and the range of SAS addresses that may be utilized in a particular enterprise produce a suitably unique value. In the SAS specification, only the full eight byte SAS address is assured to be globally unique. Use of any hash function (including those described in the SAS specifications) may produce a non-unique hashed value depending upon numerous aspects of the values being hashed and the hash function itself. As used herein, "hashed address index value" or "hashed value" presumes that such a careful selection of the hash function and the range of possible SAS addresses (i.e., values to be hashed by the hash function) such that the resulting value will be unique. In other words, "hashed address index value" and "hashed value" shall be understood to mean a unique index value.

The information retrieved from the information table is then used by element 606 to generate an appropriate OPEN request using the SAS address and potentially other parameters returned from the SAS information table by operation of element 604. Next, element 608 is operable to encode the supplied index value as a parameter in the generated OPEN request. In particular, in one exemplary embodiment, the supplied index value may be encoded as a portion of the ICT (Initiator Connection Tag) parameter of the OPEN request. Having so generated an appropriate OPEN request, element 610 is operable to transmit the generated OPEN request to the identified particular device.

The encoded supplied index value stored, for example, within the ICT parameter of the generated OPEN request permits the particular identified device to receive and store the encoded, simplified index value. The identified device, typically a SAS target device, may then utilize the same supplied index value when generating an OPEN request for return to the SAS initiator device (i.e., when a SAS target device needs to re-establish a previous open connection with the SAS initiator device).

FIG. 7 is a flowchart describing additional details regarding operation of element 520 of FIG. 5 operable to process a received OPEN request within a SAS initiator device. Such an OPEN request may be received within the initiator device when a SAS target device with which an open connection was previously established requires reestablishment of the connection for purposes of completing some SAS transaction. In accordance with features and aspects hereof, a simplified index value may be encoded in the received OPEN request to simplify processing of the OPEN request as compared to processing involving the complete eight byte SAS address of either the source or destination SAS device.

Element 700 of FIG. 7 is first operable to determine or otherwise extract the index value supplied in the received OPEN request identifying a particular SAS device (i.e., identifying the SAS target device requesting reestablishment of a previously opened connection). As noted above, the simplified index value may be encoded within the parameters of the received OPEN request. For example, the previously supplied index value may be encoded within the ICT parameter of the received OPEN request. The SAS target device transmitting the received OPEN request would have previously received the encoded supplied index value when the SAS initiator device originally established the open connection as discussed above. Element 702 is then operable to request, or arbitrate for, exclusive access to the SAS information table. Since multiple requests may be received and processed substantially simultaneously, arbitration may be desirable to provide mutual exclusivity in access to the information table. As noted above, such arbitration control techniques and structures are generally known to those of ordinary skill in the art and may be implemented, for example, as an integral aspect of the memory device used for storing this SAS information table. Element 604 (including 604-A and 604-B) as discussed above is then operable to utilize of the supplied index value to access the SAS information table and return information stored therein and associated with the SAS target device from which the received OPEN request was transmitted.

Based upon the returned information retrieved from the SAS information table using the supplied index value, element 706 is then operable to validate that the particular identified device is known to the SAS initiator and to validate that the supplied parameters in the received OPEN request are acceptable to re-establish the connection. First, the target device must be known to the receiving SAS initiator in that the initiator must have previously established a connection with the SAS device identified by the supplied index value. As noted above, using the simplified, supplied index value in the received OPEN request permits the comparison logic to be simpler and hence less costly and power consuming in its design.

Secondly, the target device corresponding to the supplied index value may support numerous connection rates and protocols. The parameters supplied in the received request must be compatible with permissible parameter information stored in the SAS information table by the SAS initiator device. If the received OPEN request supplies parameters incompatible with these permissible parameters, or if the SAS target device is simply unknown to the receiving initiator device as indicated by the information stored in the SAS information table, element 710 is operable to generate an appropriate SAS OPEN_REJECT primitive. Conversely if the received OPEN request is for a known device and supplies acceptable parameters for the requested connection, element 708 is operable to generate an appropriate SAS OPEN_ACCEPT primitive.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A SAS controller adapted for performing SAS protocol link layer processing in the role of a SAS initiator, the controller comprising:

an interface to a SAS protocol transport layer processing element wherein the controller is adapted to receive a request from the transport layer through the interface to establish a connection to a particular SAS device, and wherein the particular SAS device is identified by a supplied index value in the request, and wherein the supplied index value comprises fewer bits than the SAS address in the request;

a table having a plurality of entries each storing a corresponding SAS address for a SAS device;

a plurality of SAS protocol link layer processing elements each coupled to the interface and each coupled to the table wherein the link layer is adapted to use the supplied index value and the table to determine the corresponding SAS address for the particular SAS device, and wherein the link layer is adapted to use the corresponding SAS address in an OPEN request to establish the requested connection to the particular SAS device; and an arbitrator for arbitrating among the plurality of SAS protocol link layer processing elements when multiple of the plurality of SAS protocol link layer processing elements attempts to access the table.

2. The controller of claim 1 wherein the table is preloaded by the SAS transport layer processing element with SAS addresses discovered during SAS Discovery processing of the SAS controller.

3. The controller of claim 1 wherein each SAS protocol link layer processing element is further adapted to encode the supplied index value in parameters of the OPEN request.

4. The controller of claim 3 wherein each SAS protocol link layer processing element is further adapted to encode the supplied index value in the ICT parameter field of the OPEN request.

5. The controller of claim 1 wherein the supplied index value is a supplied hashed address index value determined by a hash function applied to a SAS address and wherein the table comprises:
   a content addressable memory device storing rows comprising a SAS address and a corresponding hashed address index value, and
   wherein each SAS protocol link layer is adapted to access the content addressable memory by applying the supplied hashed address index value to the content addressable memory to retrieve the corresponding SAS address.

6. A method operable in a SAS controller having a plurality of SAS protocol link layer processing elements and adapted to interface with a SAS protocol transport layer processing element and operating in the role of a SAS initiator, the method comprising:
   receiving a request from the SAS protocol transport layer processing element to establish a connection to a particular SAS device identified in the request by a supplied index value wherein the supplied index value comprises fewer bits than the SAS address in the request;
   arbitrating among the plurality of SAS protocol link layer processing elements requesting access to the table;
   accessing a table using the supplied index value to determine the SAS address for the particular SAS device;
   generating an OPEN request to establish the requested connection to the particular SAS device wherein the generated OPEN request uses the SAS address determined by access to the table; and
   transmitting the generated OPEN request to the particular SAS device.

7. The method of claim 6 further comprising:
   performing a SAS Discovery process to discover the SAS address of SAS target devices coupled to the SAS controller; and
   pre-loading the table with the SAS addresses discovered in the SAS Discovery process.

8. The method of claim 6 wherein the step of generating further comprises:
   encoding the supplied index value as a parameter in the generated OPEN request.

9. The method of claim 8 wherein the step of encoding further comprises:
   encoding the supplied index value in the ICT parameter field of the OPEN request.

10. The method of claim 6
    wherein the step of receiving further comprises:
    receiving the request wherein the particular SAS device is identified in the request by a supplied hashed address index value wherein the supplied index value comprises fewer bits than the SAS address associated with the particular SAS device, and
    wherein the step of accessing further comprises:
    applying the supplied hashed address index value to a content addressable memory storing the table to retrieve the SAS address corresponding to the supplied hashed address index value associated with the particular SAS device.

11. A SAS controller adapted for performing SAS protocol link layer processing in the role of a SAS target, the controller comprising:
    a plurality of interfaces to SAS communication physical media wherein the controller is adapted to receive an OPEN request from a physical medium through a corresponding interface to establish a connection to a particular SAS device, and wherein the particular SAS device is identified by a supplied index value in the OPEN request, and wherein the supplied index value comprises fewer bits than the SAS address in the OPEN request;
    a table having a plurality of entries each storing SAS connection information for a corresponding SAS device known to the controller;
    a plurality of SAS protocol link layer processing elements wherein each SAS protocol link layer processing element is coupled to a corresponding interface and is coupled to the table; and
    an arbitrator for arbitrating among the plurality of SAS protocol link layer processing elements when multiple of the plurality of SAS protocol link layer processing elements attempts to access the table.

12. The controller of claim 11 wherein the SAS connection information includes:
    a SAS address of the corresponding SAS device;
    a connection rate indicator indicating SAS connection rates supported by the corresponding SAS device; and
    a protocol indicator indicating SAS protocols supported by the corresponding SAS device.

13. The controller of claim 11 wherein each SAS protocol link layer processing element is further adapted to decode the supplied index value from parameters of the received OPEN request.

14. The controller of claim 13 wherein each SAS protocol link layer processing element is further adapted to decode the supplied index value in the ICT parameter field of the received OPEN request.

15. The controller of claim 11 wherein the supplied index value is a supplied hashed address index value determined by a hash function applied to a SAS address and wherein the table comprises:
    a content addressable memory device storing rows comprising a SAS address and a corresponding hashed address index value, and
    wherein each SAS protocol link layer processing element is adapted to access the content addressable memory by applying the supplied hashed address index value to the content addressable memory to retrieve the corresponding SAS address.

16. A method operable in a SAS controller having a plurality of SAS protocol link layer processing elements each adapted to interface with a SAS communication medium and operating in the role of a SAS initiator, the method comprising:
    receiving an OPEN request from the SAS communication medium to establish a connection to a particular SAS device identified in the request by a supplied index value in the received OPEN request wherein the supplied index value comprises fewer bits than the SAS address associated with the particular SAS device;
    arbitrating among the plurality of SAS protocol link layer processing elements requesting access to the table;
    accessing a table using the supplied index value to retrieve SAS connection information for the particular SAS device;
    validating parameters of the received OPEN request based on the retrieved SAS connection information; and transmitting a response to the SAS communication medium in response to the OPEN request to indicate the validity of the received OPEN request.

17. The method of claim 16 further comprising:

performing a SAS Discovery process to discover the SAS connection information of SAS devices known to the SAS controller; and pre-loading the table with the SAS connection information discovered in the SAS Discovery process.

18. The method of claim 16 wherein the step of generating further comprises:

decoding the supplied index value from a parameter in the received OPEN request.

19. The method of claim 18 wherein the step of decoding further comprises:

decoding the supplied index value from the ICT parameter field of the received OPEN request.

20. The method of claim 16 wherein the step of receiving further comprises:

receiving the request wherein the particular SAS device is identified in the request by a supplied hashed address index value wherein the supplied index value comprises fewer bits than the SAS address associated with the particular SAS device, and wherein the step of accessing further comprises:

applying the supplied hashed address index value to a content addressable memory storing the table to retrieve the SAS connection information corresponding to the supplied hashed address index value associated with the particular SAS device.

* * * * *